United States Patent Office 3,557,199
Patented Jan. 19, 1971

3,557,199
OXIDATION OF ACROLEIN AND METHACROLEIN
R Parthasarathy, Takoma Park, and Frank G. Ciapetta, Silver Spring, Md., assignors to W. R. Grace & Co., New York, N.Y., a corporation of Connecticut
No Drawing. Filed Feb. 21, 1967, Ser. No. 617,491
Int. Cl. C07c 51/26
U.S. Cl. 260—530
9 Claims

ABSTRACT OF THE DISCLOSURE

A catalyst composition comprising oxides of niobium and molybdenum which find particular usefulness in the catalytic vapor phase oxidation of acrolein and/or methacrolein to acrylic acid and/or methacrylic acid. In the preferred catalyst form the oxides of niobium and molybdenum are dispersed within a suitable support material, preferably silica gel.

---

This invention relates to a novel catalyst composition and an improved catalytic process for the production of unsaturated oxygen containing compounds comprising monocarboxylic acids. In one particular embodiment, the invention relates to an improved process for the direct vapor phase oxidation of acrolein and/or methacrolein to acrylic acid and/or methacrylic acid respectively in the presence of our new catalyst composition which comprises mixed oxides of niobium and molybdenum.

Unsaturated aliphatic monocarboxylic acids such as acrylic acid and methacrylic acid, for example, are valuble starting and intermediate materials for a whole series of well known reactions because of their highly reactive nature which, however, also makes these materials difficult to prepare and contributes to the problems encountered in large scale production of these acids.

The prior art processes for the production of acrylic acid and/or methacrylic acid have been based on operational procedures which are complex comprising liquid phase operation which of necessity require relatively costly equipment and are very difficult to control.

It has been recognized for sometime that a potential source of unsaturated acids is the corresponding olefins. However, large scale production of the acids directly by vapor phase oxidation of these olefins has not followed because of the relatively low yield and costly operational steps involved.

The prior art processes generally result in the generation of a mixed product that contains varying amounts of unsaturated aldehydes along with small amounts of unsaturated monocarboxylic acids. These processes were frequently directed to separation and utilization of the aldehydes in the subsequent preparation of monocarboxylic acids. Procedures of this type were obviously cumbersome and commercially unattractive.

We have found that the selective oxidation of acrolein to acrylic acid and/or methacrolein to methacrylic acid can be effected and high yields of acrylic acid and methacrylic acid can be recovered by vapor phase reaction in a single pass using our inventive catalyst. The use of our catalyst has unexpectedly been found to produce a high conversion of the reactants and more importantly has an unusually high selectivity for the production of acrylic acid and methacrylic acid.

In this system, the aldehyde, in admixture with air and steam, is passed through the reactor containing the catalyst for conversion of the aldehyde to acid.

The crux for this invention resides in a mixed oxides of niobium and molybdenum catalyst and its use for the conversion of acrolein to acrylic acid and methacrolein to methacrylic acid. Our catalyst has an Nb to Mo atomic ratio of from 0.2:1 to 5:1, preferably 0.5:1 to 2:1. We have also found that the physical strength of our mixed oxide composition may be increased without appreciable loss of catalytic activity by calcinating the composition at from 1000 to 1200° F. for 4 to 20 hours. Preferably the mixed oxide composition is dispersed upon or mixed with a support material in order to provide the finished catalyst with greater strength. Any of the conventional inorganic catalyst support materials, such as, for example, alumina, silica gel, etc., may be used. The preferred support material, and the support material used in our particular embodiment, is silica gel having a pore volume of 0.1 cc./g. to 1 cc./g. and a surface area of about 10 to 150 M.$^2$/g.

Our mixed oxide composition may be conveniently prepared by providing an aqueous solution containing the desired amount of ammonium molybdate and then by slowly adding the desired amount of niobium chloride to the ammonium molybdate solution with rapid stirring. This effects the precipitation of the mixed oxide composition. The pH of the solution is adjusted to 2.1 to effect further precipitation, by the addition of dilute ammonium hydroxide. The solution is then allowed to digest for ½ to 3 hours at a temperature of 60° C. to 80° C., to assure substantially complete precipitation. The solution is then filtered to separate the precipitated mixed oxide composition from the solution. The mixed oxide filter cake is then washed to remove any residual chloride ions. Normally a simple wash solution of deionized water may be used for this. The concentration and quantity of ammonium molybdate solution used and the amount of niobium chloride used is a stoichiometric function of the niobium to molybdenum ratio desired in the finished composition. Though this embodiment has been described in respect to ammonium molybdate and niobium chloride, obviously other niobium salts and soluble molybdate salts may be used.

If it is desired that the composition be dispersed or mixed within a support, this may be readily effected by conventional means. For example, the mixed oxide filter cake could be slurried with a silica sol to provide a salt solution having a pH of about 4. The silica sol may then be gelled by adjusting the pH of the solution to 6.5 to 7.0 by the addition of concentrated ammonium hydroxide. The mixed oxide silica gel composite may then be separated from the residual solution by filtration. The separated composite is then washed and dried. Drying may be simply effected by subjecting the composite to a temperature of 220° F. for 4 to 20 hours. The dried composite is then calcined for 4 to 20 hours at a temperature of 1000° F. to 1200° F. to activate and strengthen the composite. The particular final form or gross physical shape of the catalyst is not critical. For example, the catalyst may be extruded in the form of pellets or it may be produced in the form of finely divided particles by conventional spray drying techniques.

As previously noted, an important part of my invention is the conversion of acrolein and methacrolein to acrylic acid and methacrylic acid respectively by catalytic vapor phase oxidation, using a mixture of niobium oxide and molybdenum oxide as active components of the catalyst. In effecting this process, a feed stream comprising the unsaturated aldehyde (i.e., acrolein or methacrolein), oxygen, and preferably steam, is contacted with the mixed oxide catalyst for 1 to 10 seconds, preferably 3 to 6 seconds at a temperature of 600° F. to 1000° F., preferably 700° F. to 900° F. The feed should contain 0.25 mole to 5 moles of oxygen per mole of unsaturated aldehyde, best results being obtained when the mole ratio of oxygen to unsaturated aldehyde is greater than 0.25:1 and not more than 2:1. When steam is used in the feed mixture, the mole ratio of steam to oxygen should be in the range of 2:1 to 20:1, preferably from 4:1 to 15:1. The oxygen may be supplied either as essentially pure molecular oxygen or may be supplied as a mixture of oxygen and inert gas such as nitrogen, for example, air. The oxygen component may be mixed with the gaseous unsaturated aldehyde before the aldehyde enters the ratio zone, or it may be mixed directly into the reaction zone. The steam normally is supplied mixed with the oxygen component though it may be fed to the aldehyde feed as a separate stream. The reaction pressure is not critical, thus it is convenient and advantageous to operate at atmospheric pressure, though other pressures could be used, for example, pressures of from 1 to 5 atmospheres.

Our invention is further illustrated by the following examples, but not limited thereto.

EXAMPLE I

This example illustrates one method of preparing a catalyst comprising mixed oxides of niobium and molybdenum dispersed on a silica gel support.

In this example, an ammonium molybdate solution was prepared by dissolving 35.4 grams of $$(NH_4)_6Mo_7O_{24} \cdot 4H_2O$$

in 75 cc. of deionized water. This solution was then stirred vigorously while 54 grams of $NbCl_5$ were slowly added to the solution. This resulted in the precipitation of mixed oxides of niobium and molybdenum. An additional 50 cc. of deionized water were added to this solution, now a thick slurry, to facilitate stirring. 108 cc. of dilute ammonium hydroxide (containing one part ammonia and one part $H_2O$) were added to the slurry to raise the pH to 2.1. The slurry was then allowed to digest for one-half hour at 77° C. and then filtered. The mixed oxide filter cake was then washed free of chloride ions by washing with 2 liters of deionized water. The filter cake was then slurried with 117 grams of $SiO_2$ sol (47.35% $SiO_2$). The $SiO_2$ sol and filter cake mixture was then gelled by adjusting the pH to 6.7 by the addition of 15 cc. of concentrated ammonium hydroxide. The excess liquid was then filtered off and the remaining mixed oxide and silica gel composite was dried overnight at 220° F. The dried composite was then calcined for 16 hours at 1000° F. The resulting catalyst was 50 percent by weight silica gel and 50 percent by weight mixed oxides of niobium and molybdenum having a niobium to molybdenum atomic ratio of 1 to 1.

EXAMPLE II

This example illustrates the process according to my invention of oxidizing acrolein to acrylic acid using the catalyst prepared in Example I.

In this example, 50 cc. of a catalyst prepared in Example I was charged into an aluminized stainless steel reactor and continuously contacted with a vaporized feed mixture containing 5 mole percent acrolein, 25 percent air and 70 percent steam at atmospheric pressure. A series of three runs was made by varying the catalyst temperature. In each run, a catalyst contact time of 3.6 seconds was used. Contact time is defined as the reciprocal of the gas hourly space velocity at standard conditions. The results of these runs are summarized in the following table.

| Catalyst | Average bed temp. °F. | Percent acrolein converted | Percent ultimate yield of major products* | | |
|---|---|---|---|---|---|
| | | | Acrylic acid | Acetic acid | CO+CO₂ |
| 50% MoO₃.0.5Nb₂O₅—SiO₂ (calcined at 1,100° F.). | 729 | 64.1 | 83.3 | 3.8 | 36.3 |
| | 782 | 77.3 | 81.0 | 4.0 | 38.0 |
| | 843 | 84.1 | 75.5 | 4.7 | 50.2 |

*(Moles of product/mole of acrolein converted)×(100); note that since one mole of acrolein may produce more than one mole of products, such as, for example, CO and CO₂, the percent ultimate yield may be greater than 100%.

From the above table, it may be seen that the process according to our invention, more particularly using a niobium oxide, molybdenum oxide, composite catalyst results in a high conversion of the acrolein and more importantly produces an unusually high amount of the desired acrylic acid per mole of acrolein converted and correspondingly produces less of undesired side reaction products.

Obviously many modifications and variations of our invention may be made without departing from the essence and scope of our invention and only such limitations as are specifically cited in the appended claims should be applied.

What is claimed is:

1. A process for converting unsaturated aldehydes selected from the group consisting of acrolein, methacrolein into acrylic acid and methacrylic acid respectively by vapor phase catalytic oxidation comprising:
   (a) contacting a feed stream comprising unsaturated aldehydes from the group consisting of acrolein, methacrolein and mixtures thereof, and oxygen at a temperature of from 600° F. to 950° F. with a catalyst consisting essentially of mixtures of the oxides of niobium and molybdenum.

2. The process of claim 1 wherein the feed mixture comprises steam.

3. The process of claim 1 wherein air is used as the source of oxygen.

4. The process of claim 1 wherein the feed stream comprises 0.5 to 2.0 moles of oxygen per mole of unsaturated aldehyde and 2.0 to 15.0 moles of steam per mole of oxygen.

5. The process of claim 1 wherein the unsaturated aldehyde is acrolein and the unsaturated monocarboxylic acid produced is acrylic acid.

6. The process of claim 1 wherein the unsaturated aldehyde is methacrolein and the unsaturated monocarboxylic acid produced is methacrylic acid.

7. The process of claim 1 wherein the catalyst contact time is from 1 to 10 seconds.

8. The process of claim 1 wherein the catalyst consists essentially of a mixture of the oxides of niobium and molybdenum dispersed upon an inorganic support material.

9. The process of claim 7 wherein the atomic ratio of niobium to molybdenum is from 0.2:1 to 5:1 and the support material is selected from the group consisting of silica gel and alumina.

References Cited

UNITED STATES PATENTS 3,395,178   7/1968   Callahan _____ 260—530

LORRAINE A. WEINBERGER, Primary Examiner

R. S. WEISSBERG, Assistant Examiner

U.S. Cl. X.R.

252—467, 456